United States Patent [19]
Robinson

[11] Patent Number: 5,394,776

[45] Date of Patent: Mar. 7, 1995

[54] RADIAL CUTTING TOOL FOR CUTTING THICK-WALLED TUBULAR MEMBERS

[75] Inventor: Jerry H. Robinson, Mobile, Ala.

[73] Assignee: Wellcutter Inc., Brewton, Ala.

[21] Appl. No.: 45,411

[22] Filed: Apr. 13, 1993

[51] Int. Cl.⁶ .................. B23B 5/14; B23B 5/16; B23D 21/10; B26D 3/16

[52] U.S. Cl. ........................... 82/113; 30/95; 30/97; 407/103; 407/117

[58] Field of Search ............... 82/113; 30/95, 96, 97; 407/103, 117

[56] References Cited

U.S. PATENT DOCUMENTS

| | | | |
|---|---|---|---|
| 3,299,491 | 1/1967 | Hall | 407/103 |
| 3,551,977 | 1/1971 | Novkov | 407/103 |
| 3,889,330 | 6/1975 | Zweekly | 407/103 |
| 4,320,996 | 3/1982 | Roos | 407/103 |
| 4,357,123 | 11/1982 | Zweekly | 407/117 |
| 4,938,640 | 7/1990 | Pano et al. | 407/117 |
| 4,939,964 | 7/1990 | Ricci | 82/113 |

Primary Examiner—William E. Terrell
Attorney, Agent, or Firm—Nixon & Vanderhye

[57] ABSTRACT

A portable cutting tool has an annular frame for surrounding the pipe. A rotatable ring on the frame carries a radially fed cutter which includes a bit subassembly for cutting the tubular member. The bit subassembly is indexed in response to orbital movement of the cutter. The bit subassembly includes a bit planar support block which has a dimension (as measured parallel to the longitudinal axis of the tubular member being cut) which is less than that of the bit which it carries. In such a manner, a channel passageway may be formed between the bit support block and the tubular member being cut as the bit penetrates into the tubular member during the cutting operation such that lubricating/flushing fluid may be directed to the bit.

25 Claims, 7 Drawing Sheets

RADIAL CUTTING TOOL FOR CUTTING THICK-WALLED TUBULAR MEMBERS

FIELD OF INVENTION

The present invention relates generally to tools and methods employed to sever tubular members. In preferred forms, the present invention is, embodied in a cutting tool having an especially configured bit and an extent of radial bit travel which allows cutting and severing of relatively thick-walled tubular members.

BACKGROUND AND SUMMARY OF THE INVENTION

It is sometimes necessary to field-sever pipes, columns, and the like in a variety of endeavors. For example, in the exploration/production of off-shore oil and natural gas, it may be necessary periodically to abandon a particular exploration/production site and relocate the associated off-shore platform due to exhaustion of the oil and gas field and/or changed economic conditions which mitigates against continued exploration/production at a particular site. Relocation of the off-shore platform, however, cannot occur until all of the well casings extending from the underwater floor have been severed at a height where they would not present an obstacle to mariners, especially nets which are trawled by fisherman.

The well casings which are employed in the off-shore exploration/production of oil and natural gas, however, are typically thick composite-walled structures to prevent casing rupture and the environmental devastation which could ensue. That is, it is not uncommon for a single well casing to be composed of several sleeved pipes of increasing diameters with the space between adjacent ones of the pipes being filled with reinforcing cementation. Special difficulties in addition to the underwater environment are thus presented when an attempt is made to sever such well casings due to their relatively thick-walled structure.

While a variety of pipe machining/cutting tools and so-called pipe lathes are well known in the art (see, for example, U.S. Pat. No. 3,848,489 to Santana; U.S. Pat. No. 4,213,357 to Lively et al; U.S. Pat. No. 4,665,782 to VanderPol; U.S. Pat. No. 4,754,672 to VanderPol; U.S. Pat. No. 4,739,685 to Ricci; and U.S. Pat. No. 4,944,205 to Ricci), they are deficient in terms of their ability to cut relatively thick-walled tubular articles of the type typically encountered in connection with underwater well casings. That is, to the best of the present inventor's knowledge, none of the prior art devices are capable or could obviously be modified to function in the manner demanded when underwater thick-walled well cases are to be cut.

What has been needed in this art therefore, is a cutting tool which has the ability to reliably cut and sever relatively thick-walled tubular members (e.g., underwater composite well casings, as well as hollow or solid tubular support columns formed of metal, cement or the like). It is towards providing such a tool that the present invention is directed.

Broadly, the present invention is embodied in a tool having a cutting assembly which is both orbitally and radially movable relative to a central longitudinal axis of the tubular member being cut, whereby the cutting bit and associated support structures of the cutting assembly have an extent of radial travel and a structural configuration which allow for bit movement sufficient to cut relatively thick-walled tubular members (e.g., to, and preferably at least slightly through, the longitudinal center of the tubular member).

More specifically, the present invention is embodied in a cutting tool for cutting thick-walled tubular members which includes a stationary annular frame and a radial cutting assembly which is radially mounted on the frame for orbital movement about the tubular member being cut. The radial cutting assembly is itself provided with a cutting bit subassembly that is radially advanced into the tubular member in response to the cutting assembly's orbital movement.

A cutting bit is carried forwardly of a radially movable bit support block. As viewed in relation to the longitudinal axis of the tubular member being cut, the cutting bit presents a cutting edge that has a greater dimension as compared to the following bit support block and associated structure. As such, the following supporting structure for the bit will establish passageways when the bit is advanced sufficiently into the tubular member being cut to conveniently allow for shavings and debris to be removed from the cutting face of the bit. Moreover, such established passageways allow lubricating/flushing fluid ,(e.g., water, oil or the like) to be admitted to the bit so as to assist in the cutting operation.

Further aspects and advantages will become evident from the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
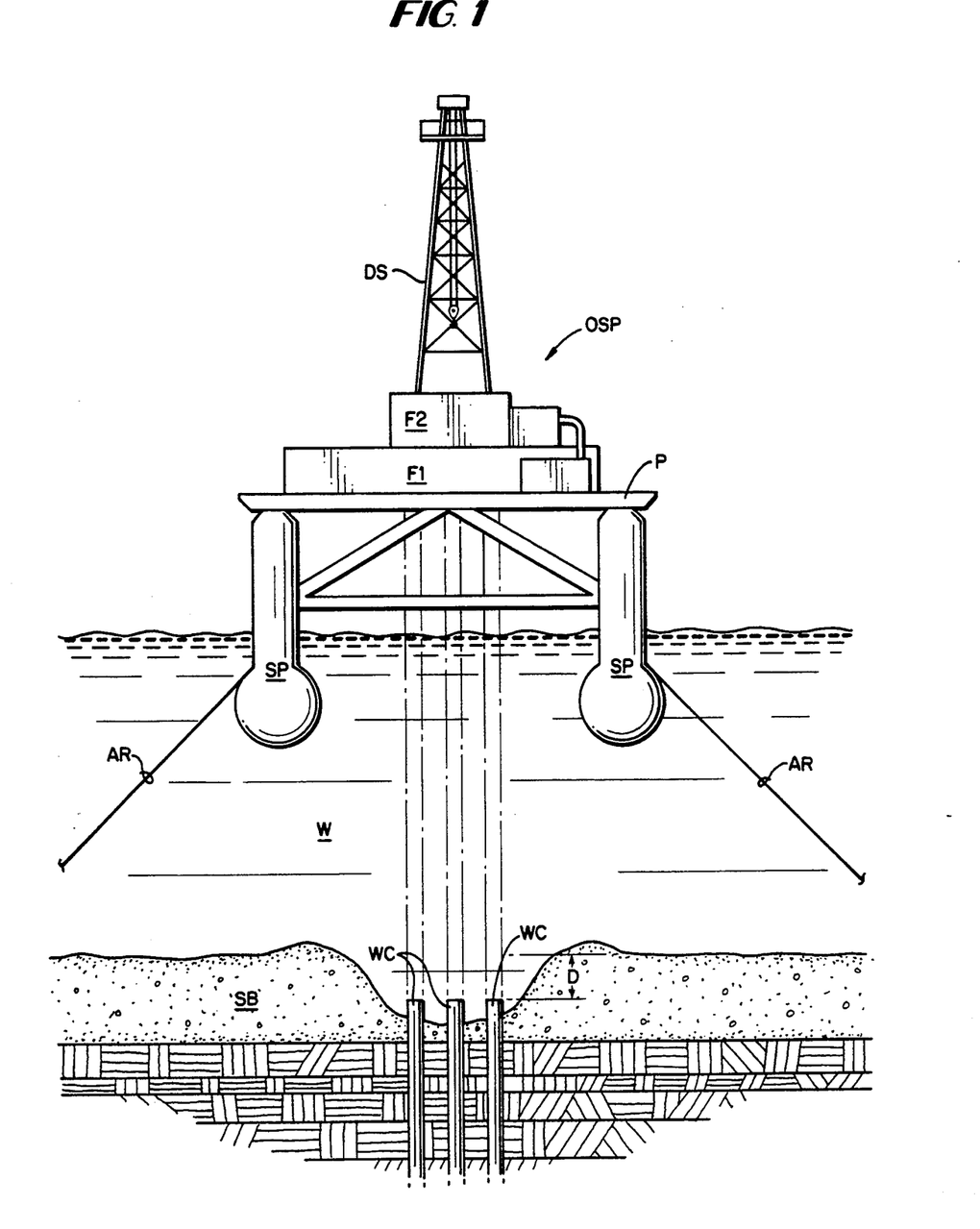
FIG. 1 is a schematic elevational view of an off-shore oil and gas exploration/production platform showing a representative number of well casings associated therewith.

As noted briefly above, the cutting tool of this invention is especially adapted to cutting relatively thick-walled well casings WC associated with an off-shore oil and gas exploration/production platform OSP as schematically depicted in accompanying FIG. 1. As used herein and in the accompanying claims, the term "thick-walled" and like terms are meant to refer to tubular members having a wall thickness dimension to be cut that is at least about 30%, and more likely at least about 50% or more (e.g., greater than about 75%) of the overall radial dimension of the tubular member. Thus, the term "thick-walled" and like terms are meant to refer to both hollow and solid tubular members.

The off-shore platform OSP is in and of itself conventional in that it may include support piers SP which support a platform P, exploration/production facilities F1 and F2, and a derrick superstructure DS above the surface of the water W. The off-shore platform OSP is positionally fixed at the exploration/production site by any conventional means, such as by suitable anchors (not shown) attached to the support piers SP by anchor rodes AR.

During exploration and/or production of oil and/or natural gas, the well casings WC will, of course, extend from the subterranean oil/gas reservoir to the facilities F1 and/or F2 supported on the platform P. When the off-shore exploration/production site is to be abandoned, however, the individual well casings WC must be cut and capped at a level which would not present an obstacle to mariners, for example, a depth D below the surface of the silt bed SB. In this regard, an underwater work crew will initially remove the silt covering a section of the well casings WC to the desired depth D below the silt bed SB surface using high pressure fluid (e.g., high pressure air and/or water). The well casing WC may then be severed at or below the depth D using the radial cutting tool of this invention (to be explained below). Once the upper sections of the well casing is (represented by phantom line in FIG. 1) are removed, the remaining lower sections of the well casings (represented by solid line in FIG. 1) may again be covered by silt so as to present no obstacles to mariners. The entire off-shore platform OSP may then be relocated to a new exploration/production site, if desired.

The radial cutting tool CT according to this invention which is especially adapted to cutting the well casings WC at an off-shore platform OSP site as discussed above is shown in accompanying FIGS. 2 and 3. As is seen, the cutting tool CT of this invention is generally comprised of a support collar 10, an annular frame assembly 30, and a radial cutting assembly 50.

Figure 2:
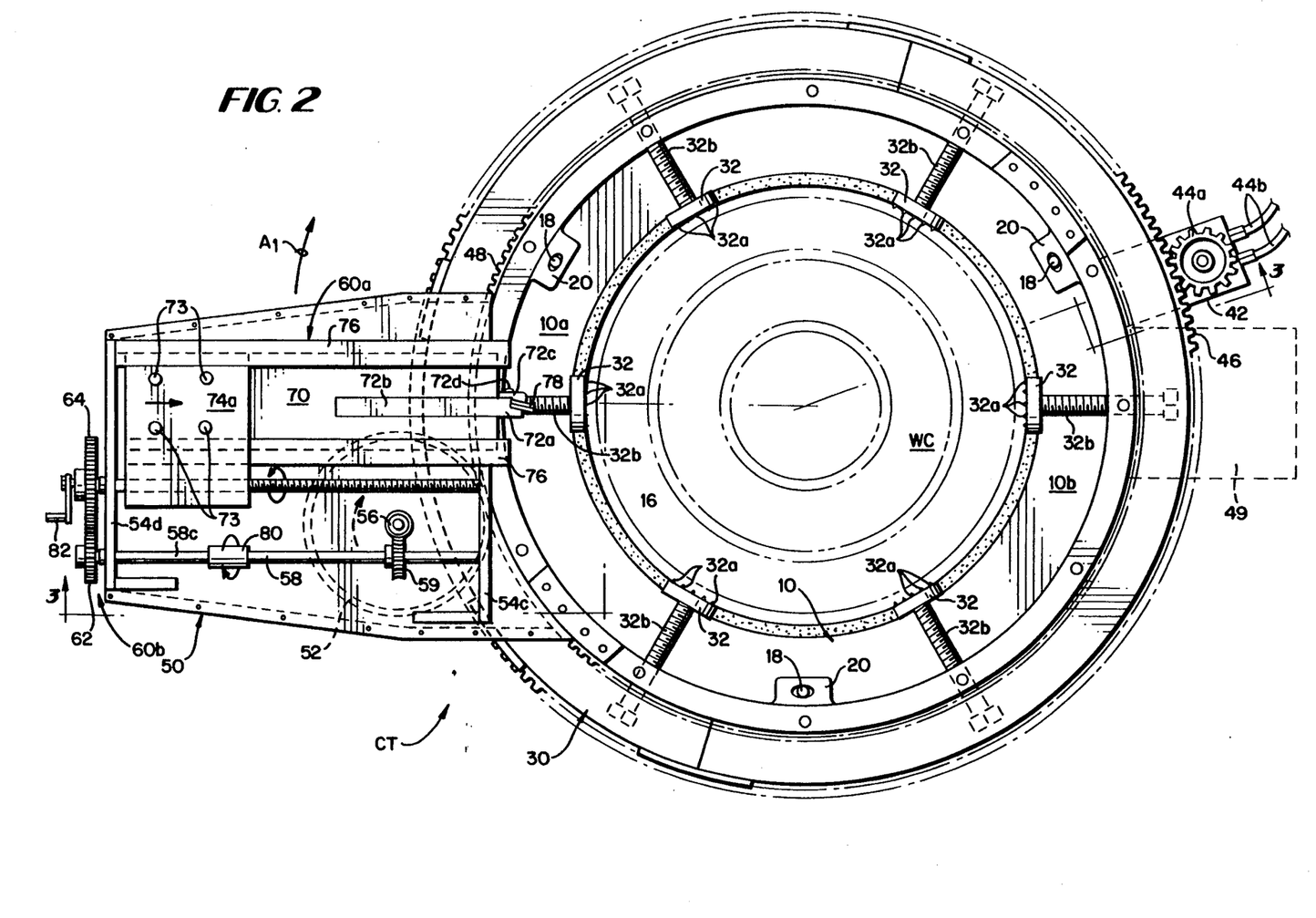
FIG. 2 is a top plan view of the radial cutting tool according to this invention.
Figure 3:
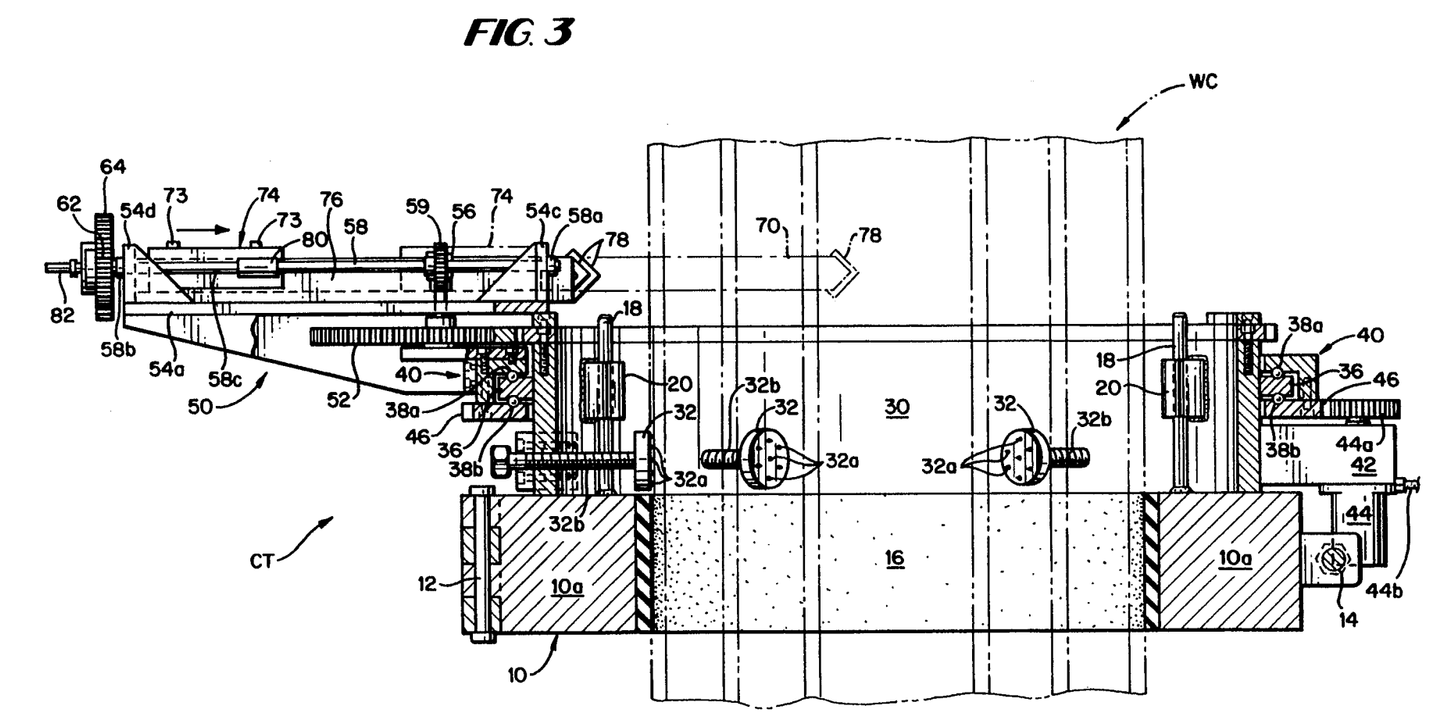
FIG. 3 is a cross-sectional elevational view of the radial cutting tool shown in FIG. 2 as taken along line 3—3 therein.

The support collar 10 provides a platform for the annular frame assembly 30 and, as such, stabilizes the annular frame assembly 30 in a plane substantially transverse to the central longitudinal axis of the well casing WC. In this regard, the support collar 10 is most preferably a clam-shell structure having a hinge 12 opposite to a clasp 14. Thus, the halves 10a of the support collar 10 may be pivoted relative to one another to facilitate positioning on the exterior surface of the well casing WC. The inner surface of the support collar 10 is most preferably provided with a compressible liner 16 formed, for example, of a suitable elastomeric material so as to enhance the gripping effect which the support collar 10 has on the exterior surface of the well casing WC. The support collar 10 is further provided with upstanding alignment rods 18 which mate with apertured alignment ears 20 disposed on the interior surface of the annular frame 30.

Since the support collar 10 is positionally fixed relative to the well casing WC, it will provide a platform so as to stabilize the annular frame 30. The annular frame 30 is further stabilized (especially against torsional forces) by anchoring feet 32. The forward faces of the anchoring feet 32 are most preferably provided with a number of hardened spikes 32a which may be moved into positive engagement with the exterior surface of the well casing by turning movements being applied to support bolts 32b. In such a manner, the annular frame 30 is stabilized during operation against substantial movement relative to the well casing WC.

An annular bearing flange 34 is rigidly coupled to (e.g., by welding) an exterior surface portion of the annular frame 30 and includes races for an opposed set of ball bearings 38a and 38b, respectively. The bearing flange 36 supports a channel ring assembly 40 for orbital movement about the annular frame 30 (and hence about the well casing WC). That is, the channel ring assembly 40 defines a generally U-shaped annular channel in which the bearing flange 34 is positioned. Orbital movement of the channel ring assembly 38 is thus facilitated by means of the ball bearing sets 38a, 38b contained in their respective races.

The annular frame 30 also includes a motor mount 42 which supports a drive motor 44. The drive motor 44 is, in turn, coupled to a driven ring gear 46 associated with the channel ring assembly 40 via a drive pinion gear 44a. The motor 44 employed in the cutting tool CT of the present invention is most preferably hydraulic-actuated via hydraulic lines 44b due to the underwater environment in which it is intended for use. However, other motive means, such as electric motors, internal combustion engines, and the like may also be employed in non-submerged environments (e.g., to cut above-ground well casings or other hollow or solid tubular members). It will be appreciated, therefore, that the intermeshed relationship between the drive pinion 44a and the driven ring gear 46 will cause the entire channel ring assembly 40 to orbit in a predetermined direction (i.e., which is preferably clockwise as viewed in FIG. 2, but depends upon the rotation direction of the pinion gear 44a) about the annular frame 30, and hence about the well casing WC. Depending upon the size of the radial cutting assembly 50 (which is dependent upon the maximum size of the tubular member to be cut) it may be necessary to fix a counterpoise (shown in phantom line in FIG. 2 identified by reference numeral 49) to the rotatable channel ring 40 at a location in substantial radial opposition to the cutting assembly 50.

The annular frame 30 also includes a stationary ring gear 48 which is concentrically disposed with respect to the driven ring gear 46 associated with the channel ring assembly 40. The stationary ring gear 48 is, moreover, intermeshed with an indexing gear 52 which is rotatably carried by the radial cutting assembly 50, the purpose of which will be described in greater detail below.

Figure 4:
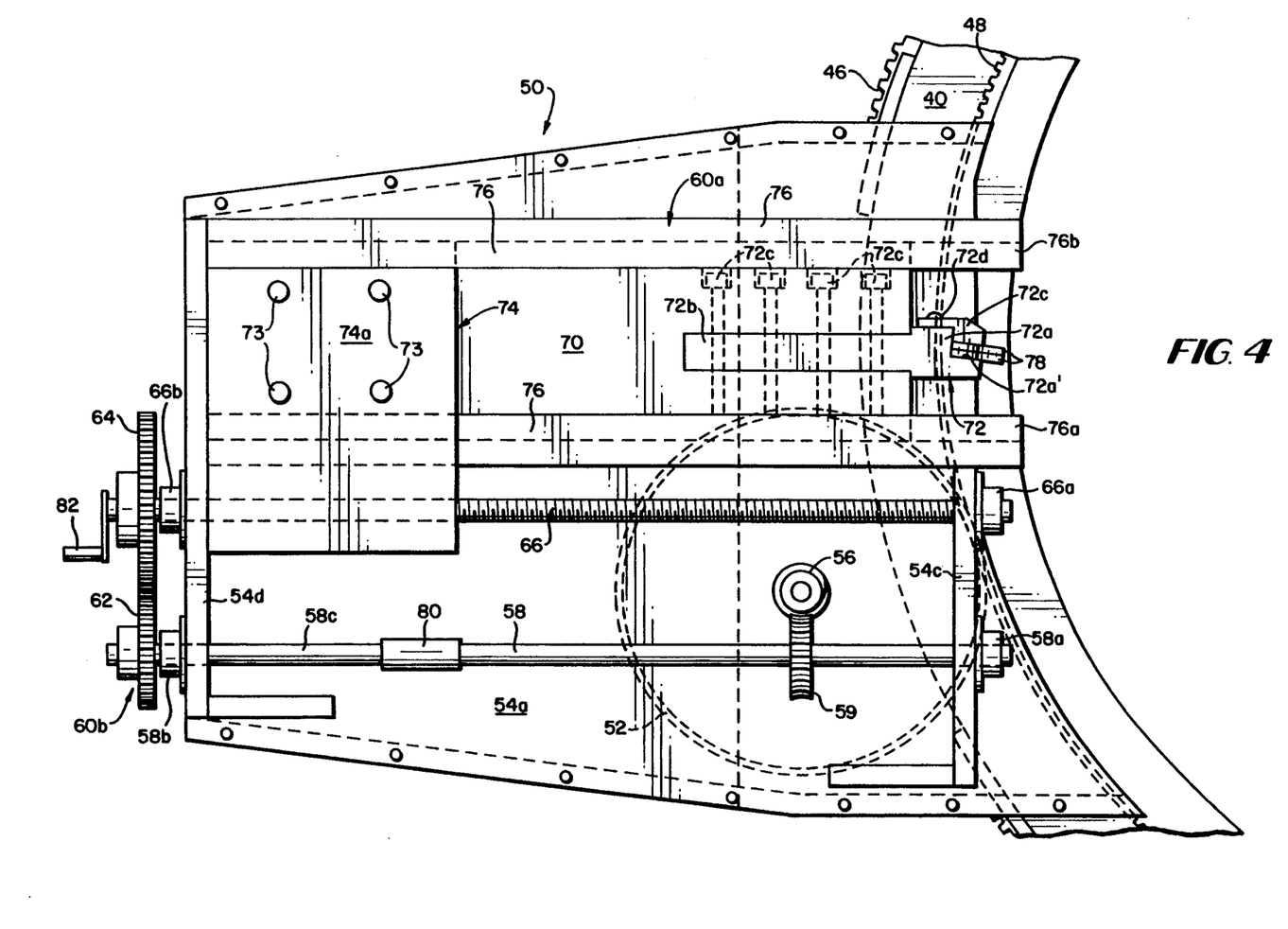
FIG. 4 is an enlarged top plan view of the radial cutting arm assembly associated with the cutting tool of this invention.
Figure 5:
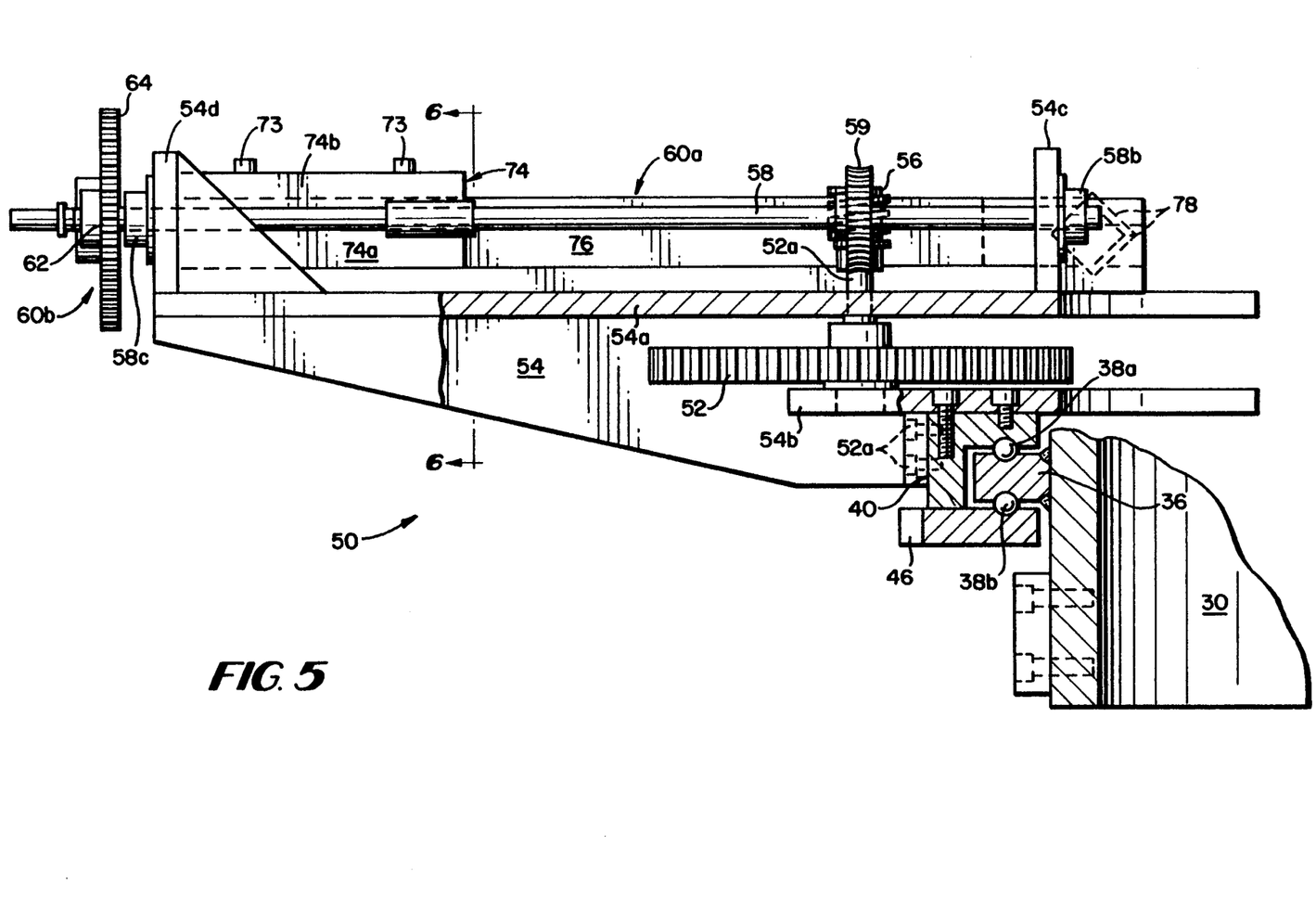
FIG. 5 is a right side elevational view, partly in section, of the radial cutting arm assembly shown in FIG. 4.
Figure 6A:
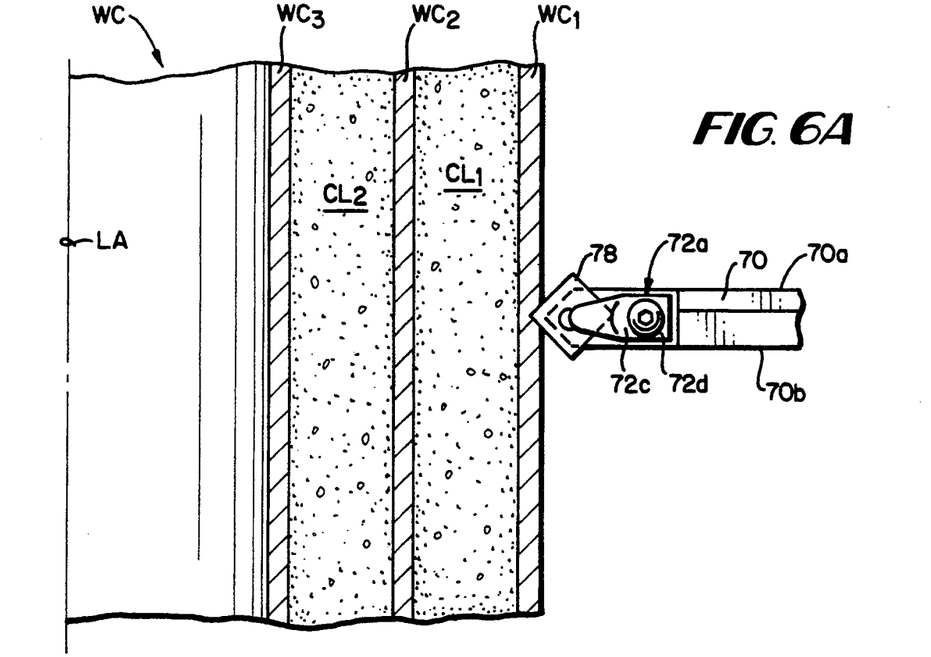
FIG. 6 is a cross-sectional elevational view of the radial cutting arm assembly shown in FIG. 5 as taken along line 6—6 therein.
Figure 6B:
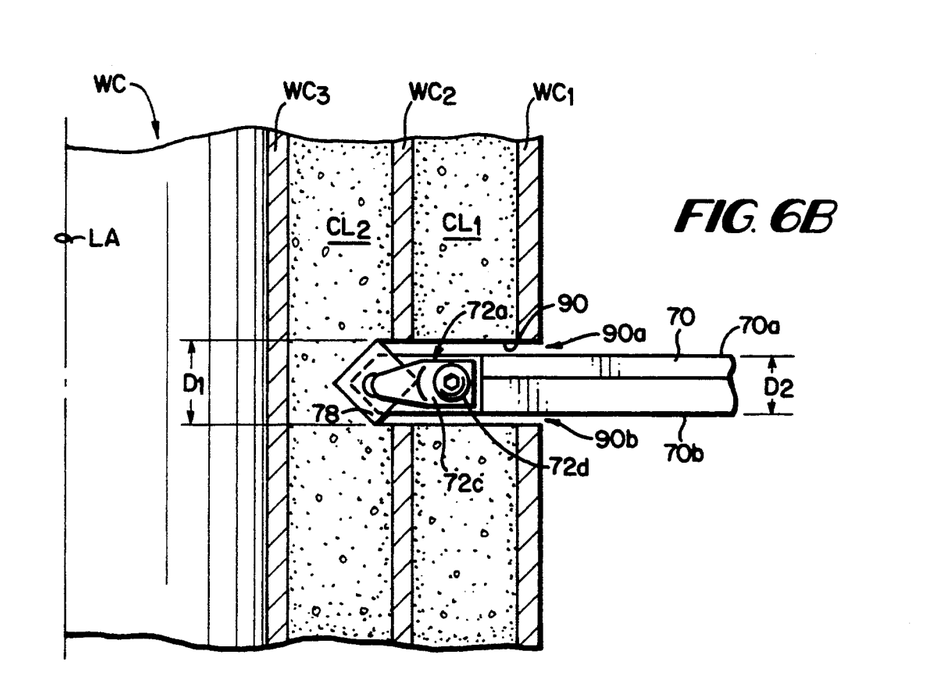

The radial cutting assembly 50 is more clearly shown in accompanying FIGS. 4–6 as including a support platform frame 54 which is generally radially oriented relative to the annular frame 30. The support platform frame 54 is rigidly coupled to the annular channel ring 40 by any suitable means, such as welding or by bolts 52a shown in FIG. 5. As a result, the entire support platform frame 54, and the radial bit and indexing subassemblies 60a and 60b, respectively, carried thereby, orbit as a unit with the annular ring channel 40.

The indexing gear 52 is mounted for rotation between upper and lower plate members 54a, 54b, respectively, associated with the support platform plate 54 by means of suitable bearings (not shown) and includes a shaft 52a which carries at its upper end a worm gear 56. The worm gear 56 is, in turn, meshed with an input gear 59 fixed to input shaft 58. The input shaft 58 is mounted between the forward and rearward support flanges 54c, 54d, respectively, of the support platform 54 by bearing structures 58a, 58b to allow for rotation about its longitudinal axis. As a result, rotation of the indexing gear 52 will responsively cause the input shaft to rotate due to the intermeshed relationship of worm gear 56 and input gear 59.

A transfer gear 62 is fixed to the rearward end of the input shaft 58 and is intermeshed with a reducing gear 64 fixed to the rearward end of the threaded indexing shaft 66. The indexing shaft 66, like input shaft 58, is mounted between the support flanges 54c, 54d for rotational movement about its longitudinal axis by means of bearing structures 66a, 66b associated with the forward and rearward support flanges 54c, 54d. Therefore, upon rotation of the input shaft 58, the threaded indexing shaft 66 will simultaneously rotate due to the intermeshing of gears 62 and 64.

The radial bit subassembly 60a is generally comprised of a bit support block 70 which forwardly carries a bit holder 72 and which is rigidly coupled (e.g., via bolts 73) to an actuator block 74. The actuator block 74 includes an indexing block 74a which is threadably coupled to the indexing shaft 66 and a bridge plate 74b which serves to rigidly connect the indexing block 74a to the bit support block 70. In this regard, the indexing block 74a and bridge plate 74b are preferably rigidly connected to one another by welding, but could likewise be connected to one another via removable bolts or the like, if desired. The threaded interconnection between the indexing shaft 66 and indexing block 74a will translate rotational movement of the former into rectilinear movement of the latter (i.e., along the shaft 66). Such rectilinear movement of the indexing block 74a will thereby cause the bit support block 70 to be moved rectilinearly within its guideway 76 by virtue of the rigid interconnection between the indexing block 74a and bit support block 70 provided by the bridge plate 74b.

Although virtually any structure may be employed in order to permit rectilinear sliding movements of the bit support block 70 toward and away from the tubular member to be cut, the preferred structures are shown as guideway 76 in accompanying FIG. 6. In this regard, the guideway 76 most preferably has a pair of spaced-apart inverted L-shaped guide fingers 76a, 76b which define respective guide channels 76a', 76b'. These guide channels 76a', 76b' thus accept and cooperate with laterally outwardly extending guide flanges 70a, 70b, respectively, associated with the bit support block 70 so that only rectilinear movements of the bit support block 70 relative to the guideway 76 (and relative to the tubular member to be cut).

The bit holder 72 includes a forward chuck 72a and a rearward stem 72b. The stem 72b is inserted into, and rigidly held by, the forward end of the bit support block 70 by the removable blind bolt assemblies 72c. Although the stem 72b may be welded to the bit support block 70, the provision of the bolt assemblies 72c allows the entire bit holder 72 to be more easily removed and replaced if needed.

The chuck 72a includes a vertical planar support surface 72a' (see FIG. 4). A pair of cutting bits 78 are provided and are supported against the support surface 72a' by means of L-shaped clamp 72c which is secured to the chuck 72 by chuck bolt 72d. Thus, the clamp 72c rigidly secures the bits 78 to the chuck 72a by tightly pressing the bits 78 against the support surface 72a'. As is also seen in FIG. 4, the planar support surface 72a' is angled in a trailing direction (i.e., away from) the orbital direction of the radial cutting assembly 50 (arrow $A_1$ in FIG. 2). That is, the angled support surface 72a will cause the vertical plane of the cutting bit 78 to form a like angle (e.g., less than 15°, and typically less than 10°) with a radial plane of the casing being cut which is coincident to the midplane of the chuck 72a. Thus, the support surface 72a' will orient the planar bits 78 substantially parallel to the longitudinal axis of the well casing WC (or other tubular member) being cut, but will cant the cutting edge of the bits 78 in a direction away from the direction in which the bits 78 orbit.

The bits 78 are preferably square-shaped and oriented on the diagonal so as to present a generally triangular-shaped cutting edge to the casing being cut. Although any suitable bit 78 may be employed (subject to the dimensional criteria noted briefly above, and to be discussed in greater detail below), the preferred bit is a coated insert bit commercially available from GTE Valenite Corporation of Madison Heights, Mich. as part number C5BASNMG643GR-235.

In order to permit manual advancement and retraction of the bit 78 toward and away from the tubular member (which might need to occur at the start and finish of the cutting operation, respectively), a spline coupler 80 is provided with input shaft 58 and a handle 82 is provided with reducing gear 64. When the spline coupler 80 is axially moved, the stub shaft 58c will be uncoupled from the input shaft 58 thereby uncoupling the gear 62 from the drive train represented by the gears 52, 56 and 59. As a result of such uncoupling, the handle 82 may be manipulated so as to turn reducing gear 64 in a desired direction to cause the indexing block 74 (and hence the bit 78) to be moved manually toward or away from the tubular member. Preferably, the spline coupler 80 is spring-biased so as to urge the same into a position which couples the shaft 58 to its associated stub shaft 58c.

In operation, a work crew will preposition the support collar 10 so that it is secured to the exterior surface of the tubular member (e.g., a well casing WC) below the desired cut location. In this regard, the support collar 10 will be so positioned as to establish a platform surface for the annular frame 30 of the cutting tool CT which is substantially transverse to the central longitudinal axis of the tubular member to be cut. Thereafter, the annular frame 30 (and its associated radial cutting assembly 50) will be positioned on and supported by the the propositioned collar 10 by aligning the rods 18 with the apertured ears 20. Once the frame 30 is supported on the collar 10, the anchoring feet 32 are advanced into anchoring contact with the exterior surface of the tubular member.

The cutting tool CT of this invention will thus be stabilized against substantial movement as described above and will then be ready to perform a cutting operation on the tubular member. In this regard, the cutting bit 78 may be advanced manually into engagement with the exterior surface of the tubular member to be cut by uncoupling the shaft 58 from its associated stub shaft 58c via spline coupler 80 and manipulating the handle 82 as described previously. Thereafter, with the shafts 58 and 58a again coupled to one another via coupler 80, the motor 44 can be operated so as to cause the channel ring assembly 40 to rotate about the tubular member in a desired direction (e.g., in a clockwise direction shown by arrow $A_1$ in FIG. 2) due to the intermeshed relationship of the drive pinion gear 44a and the driven ring gear 46. Since the entire cutting assembly 50 is rigidly secured to the channel ring assembly 40, it will rotate in the same direction concurrently with the channel ring 40.

As the cutting assembly 50 orbits the tubular member being cut, the bit 78 will continuously be advanced radially toward the central longitudinal axis of the tubular member being cut. That is, since the indexing gear 52 is intermeshed with the stationary ring gear 48, rotation of the channel ring 40 will cause the indexing gear 52 to rotate. Such rotation of the indexing gear 52 will be transferred to the reducing gear 62 via gears 56 and 59, shaft 58 and gear 62 as described previously. Therefore, rotation of reducing gear 64 will, in turn, forwardly drive (i.e., radially toward the central elongate axis of the tubular member being cut) the bit support block 70 (and hence the bit 78 forwardly carried thereby) by virtue of the threaded interconnection of the actuator block 74 and the Shaft 66 (which rotates in the same direction as reducing gear 64). Preferably, the gear teeth, and reduction ratios achieved by the indexing subassembly 60b are selected such that, upon each orbit of the radial cutting assembly 50, the bit 78 will have been advanced about 0.015" into the tubular member being cut. Of course, other depth-of-cuts may be achieved depending upon a variety of factors, including the size of the tubular member being cut, the output torque associated with the drive motor, the type of bit employed, and/or the material from which the tubular member is constructed.

Figure 7:
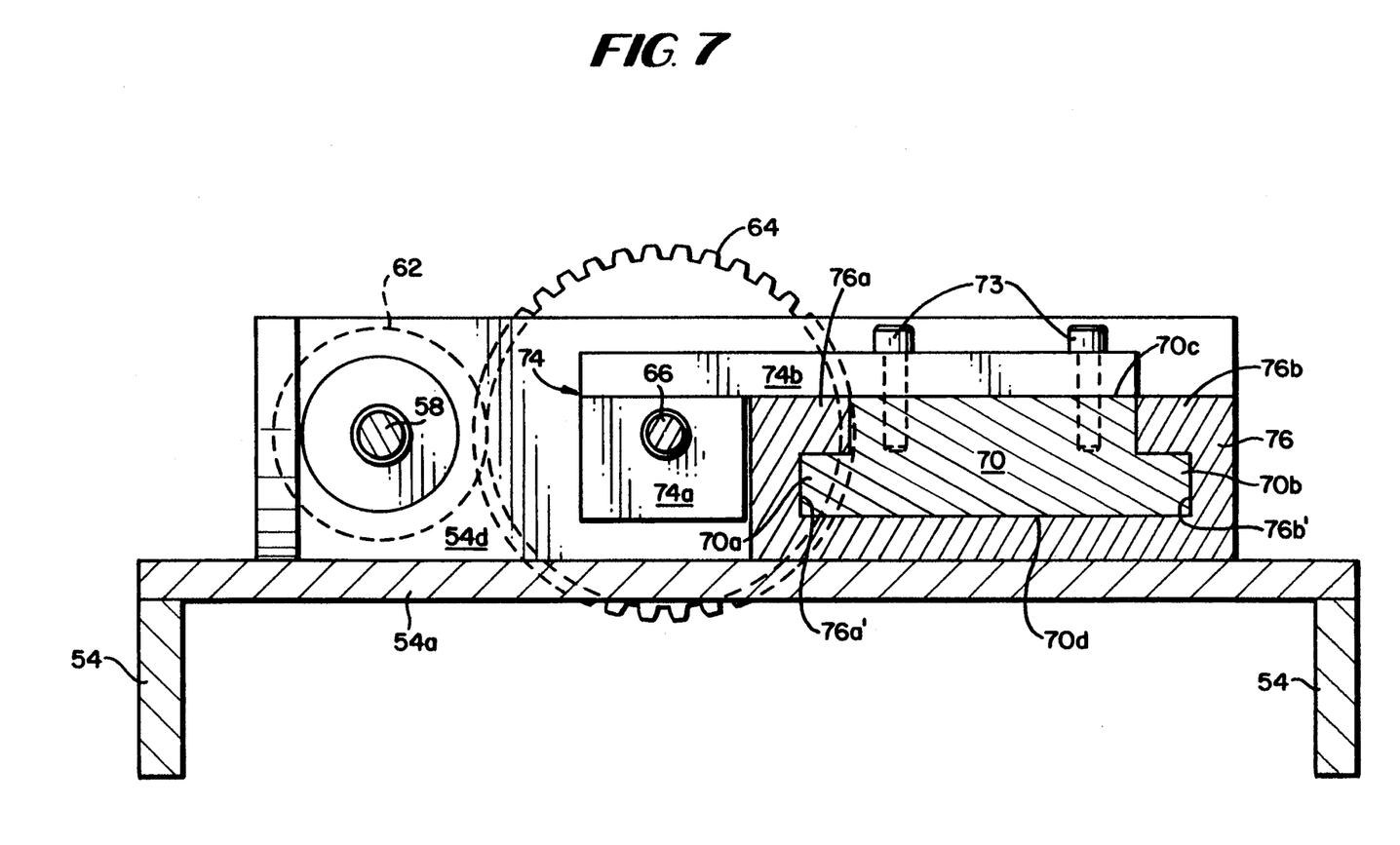
FIGS. 7A and 7B schematically show the relationship between the cutting bit subassembly and the thick-walled tubular member being cut at different stages during the cutting operation.

Accompanying FIGS. 7A and 7B schematically show the relationship between the tubular member being cut (in this case a well casing WC composed of several metal casing sleeves $WC_1$-$WC_3$ and interposed cementation layers $CL_1$-$CL_2$) at the beginning of the cutting operation (FIG. 7A) and at a time later in the cutting operation (FIG. 7B). In this regard, it will be observed that the triangular-shaped cutting edge which is presented to the well casing WC by the bit 78 will form a channel cut 90 in the well casing WC from its periphery toward its central longitudinal axis LA as the radial cutting assembly 50 is moved orbitally about the well casing WC.

Furthermore, the channel cut 90 will be in the plane established by, for example, the bit support block 70 (i.e., a plane which is substantially transverse to the central longitudinal axis LA. Since the cutting bit 78 will continuously be advanced into the well casing toward the central longitudinal axis LA as described above, the bit 78 will progressively cut a deeper channel 90 in the sidewall of the well casing WC (e.g., comprised of sleeved well casings $WC_1$-$WC_3$ and interposed cementation layers $CL_1$-$CL_2$) as can be seen by comparing FIG. 7A to FIG. 7B. Thus, the extent of travel of the bit 78 is such that it has a radial dimension which is at least equal to the thickness of the sidewall of well casing WC. Preferably, however, the radial cutting assembly 50 is configured and sized so that the forwardmost extent of travel of the bit 78 is at least equal to, and more preferably somewhat greater than, the radial dimension of the well casing WC to be cut. In such a manner, "beyond center" (i.e. to and through the central longitudinal axis LA of the well casing WC) cutting may be accomplished so that virtually any wall thickness associated with a well casing WC that may be accommodated by the cutting tool CT according to this invention can be cut and severed.

In order to accomplish the functions noted above, it is important to the cutting tool CT of this invention that the dimension $D_1$ of the cutting face presented to the well casing by the bit 78 be greater than the width dimension $D_2$ of the bit support block 70 as measured between its opposed parallel planar surfaces 70c, 70d (see FIG. 6). Thus, since the bit 78 is square-shaped according to the preferred embodiment of this invention and is oriented on its diagonal so as to present a triangular-shaped cutting edge to the well casing WC, subchannels 90a, 90b will be established between each respective surface 70a and 70b of the bit support block 70 and the side wall of the well casing being cut, which serve as a convenient passageway to allow the introduction lubricating/flushing fluid to the bit 78 and the removal of cutting debris therefrom. Most preferably, therefore, the dimension $D_1$ of the cutting bit 78 is oriented symmetrically with respect to the dimension $D_2$ of the bit support block 70 so that a slight but meaningful extent of the cutting edge (e.g., between about 0.125" to about 0.150") extends beyond each surface 70a, 70b of the bit support block 70 so that the subchannels 90a, 90b may be formed during the cutting operation.

It should now be realized that the cutting tool CT of this invention is especially suited to cutting relatively thick walled tubular members, for example, as might be encountered with underwater well casings. However, even though the invention has been described in connection with the cutting of such underwater well casings, it should be understood that such a description represents a preferred exemplary embodiment of the invention. Thus, the cutting tool CT as described above could be used satisfactorily to cut above-ground well casings or virtually any hollow or solid tubular member (e.g., concrete support piers), that may be desired.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cutting tool for cutting tubular members comprising:
    an annular frame assembly which is concentrically positionable about the tubular member to be cut such that said cutting tool is disposed in a cutting plane which is normal to the tubular member's longitudinal axis; and
    a radial cutting assembly coupled to said annular frame assembly for orbital movement about said tubular member within said cutting plane so as to cut said tubular member, wherein
    said radial cutting assembly includes a bit subassembly having (i) a bit support block which has opposed planar surfaces parallel to said cutting plane so as to establish therebetween a thickness dimension of said bit support block, and (ii) a bit carried rigidly at a forward end of said bit support block so as to be in a mounting plane which is substantially transverse to said opposed parallel planar surfaces and thereby oriented substantially parallel to the tubular member's longitudinal axis, and wherein said bit has a substantially triangular cutting edge having lateral portions which extend past said opposed parallel planar surfaces of said bit support block such that said bit cuts a channel in the tubular member having a dimension measured parallel to the tubular member's longitudinal axis which is greater than the thickness dimension of said bit support block.

2. A cutting tool as in claim 1, further comprising an indexing subassembly for advancing said bit support block into said tubular member in response to said orbital movement of said radial cutting assembly.

3. A cutting tool as in claim 2, wherein said annular frame includes a stationary gear, and wherein said indexing subassembly includes:
an indexing gear intermeshed with said stationary gear of said annular frame;
an indexing block rigidly coupled to said bit support block; and
a drive train operatively connecting said indexing gear and indexing block for translating rotational movement of said indexing gear into rectilinear movement of said indexing block in response to said orbital movement of said radial cutting assembly.

4. A cutting tool as in claim 3, wherein said drive train includes:
an input shaft;
a drive gear assembly operatively connecting said indexing gear and input shaft so that said input shaft rotates in response to rotation of said indexing gear;
a rotatable threaded indexing shaft which is threadably coupled to indexing block; and
a gear reduction assembly operatively interconnecting said input and indexing shafts so that said indexing shaft rotates in response to said input shaft and thereby rectilinearly moves said indexing block.

5. A cutting tool as in claim 4, wherein said input shaft includes a stub shaft and a spline coupler which normally couples said stub and input shafts.

6. A cutting tool as in claim 5, wherein said gear reduction assembly includes a handle to allow manual advancement of said indexing block when said stub and input shafts are uncoupled by said spline coupler.

7. A cutting tool as in claim 1, wherein said annular frame includes a bearing flange, and a channel ring rotatably coupled to said bearing flange, and wherein said radial cutting is rigidly connected to said channel ring.

8. A cutting tool as in claim 7, further said channel ring includes a driven ring gear, and wherein said annular frame supports a motor having a drive pinion gear intermeshed with said driven ring gear.

9. A cutting tool as in claim 1, wherein said annular frame includes a number of radially disposed anchoring feet moveable into anchoring contact with the tubular member.

10. A cutting tool as in claim 1, wherein said bit is substantially planar and wherein said mounting plane forms an angle with a radial plane of the tubular member which is coincident to a midplane of said bit support block.

11. A cutting tool as in claim 1 or 10, wherein said bit support block includes a chock defining a planar support surface, and a clamp which forcibly clamps said bit against said support surface.

12. A cutting tool as in claim 1, further comprising a counterpoise fixed to said annular frame for orbital movement about said tubular member at a location in substantial radial opposition to said radial cutting assembly.

13. A cutting tool for cutting a tubular member comprising:
an annular frame having a rotatable ring which is adapted to surround the tubular member to be cut;
a radial cutting assembly radially connected to said rotatable ring so as to be orbitally movable about the tubular member to be cut in response to rotation of said rotatable ring;
a bit subassembly carried by said radial cutting assembly for cutting said tubular member; and
a drive/indexing assembly for (1) drivenly rotating said rotatable ring to cause said radial cutting assembly to move orbitally about said tubular member, and (2) indexing said bit radially toward a central longitudinal axis of said tubular member in response to said orbital movement of said radial cutting assembly whereby said tubular member is cut thereby, wherein
said bit subassembly includes (i) a cutting bit having a dimension $D_1$ as measured parallel to said central longitudinal axis, and (ii) a planar bit support block which is disposed in a cutting plane transverse to said central longitudinal axis and which radially extends rearwardly of said bit and having a dimension $D_2$ as measured parallel to said central longitudinal axis which is less than said dimension $D_1$ of said bit, whereby a channel passageway coincident to said cutting plane is formed by said bit support block as said bit penetrates into said tubular member, and wherein said drive/indexing assembly includes:
an indexing gear intermeshed with said stationary gear of said annular frame;
an indexing block rigidly coupled to said bit support block; and
a drive train operatively connecting said indexing gear and indexing block for translating rotational movement of said indexing gear into rectilinear movement of said indexing block in response to said orbital movement of said radial cutting assembly,
said drive train including
an input shaft;
a drive gear assembly operatively connecting said indexing gear and input shaft so that said input shaft rotates in response to rotation of said indexing gear;
a rotatable threaded indexing shaft which is threadably coupled to indexing block; and
a gear reduction assembly operatively interconnecting said input and indexing shafts so that said indexing shaft rotates in response to said input shaft and thereby rectilinearly moves said indexing block.

14. A cutting tool as in claim 13, wherein said input shaft includes a stub shaft and a spline coupler which normally couples said stub and input shafts.

15. A cutting tool as in claim 14, wherein said gear reduction assembly includes a handle to allow manual advancement of said indexing block when said stub and input shafts are uncoupled by said spline coupler.

16. A cutting tool as in claim 13, wherein said annular frame includes a bearing flange, and wherein said rotatable ring includes a channel ring rotatably coupled to said bearing flange.

17. A cutting tool as in claim 16, wherein said channel ring includes a driven ring gear, and wherein said annular frame supports a motor having a drive pinion gear intermeshed with said driven ring gear.

18. A cutting tool as in claim 13, wherein said annular frame includes a number of radially disposed anchoring feet moveable into anchoring contact with the tubular member.

19. A cutting tool as in claim 13, wherein said cutting bit defines a substantially triangular cutting edge.

20. A cutting tool as in claim 13, wherein said cutting bit is substantially planar and wherein said mounting plane forms an angle with a radial plane of the tubular member which is coincident to a midplane of said bit support block.

21. A cutting tool as in claim 13 or 20, wherein said bit support block includes a chock defining a planar support surface, and a clamp which forcibly clamps said bit against said support surface.

22. A cutting tool as in claim 13, further comprising a counterpoise fixed to said rotatable ring at a location in substantial radial opposition to said radial cutting assembly.

23. A cutting tool as in claim 1 or 13, further comprising a support collar attachable to an exterior surface of said tubular member to be cut to provide a platform support for said annular frame.

24. A cutting tool as in claim 23, wherein said annular frame includes an apertured alignment ear, and wherein said support collar includes at least one upstanding alignment rods insertable into said apertured alignment ear.

25. A cutting tool as in claim 23, wherein said support collar is a clamshell configuration having opposed hinge and clamp structures.

* * * * *